Nov. 10, 1931.   H. O. SMITH   1,831,371
REAMER AND PILOT THEREFOR
Filed April 3, 1926   6 Sheets-Sheet 1

INVENTOR.
Harry O. Smith
BY
Erwin, Wheeler & Woolard
ATTORNEYS.

Nov. 10, 1931.  H. O. SMITH  1,831,371
REAMER AND PILOT THEREFOR
Filed April 3, 1926   6 Sheets-Sheet 2
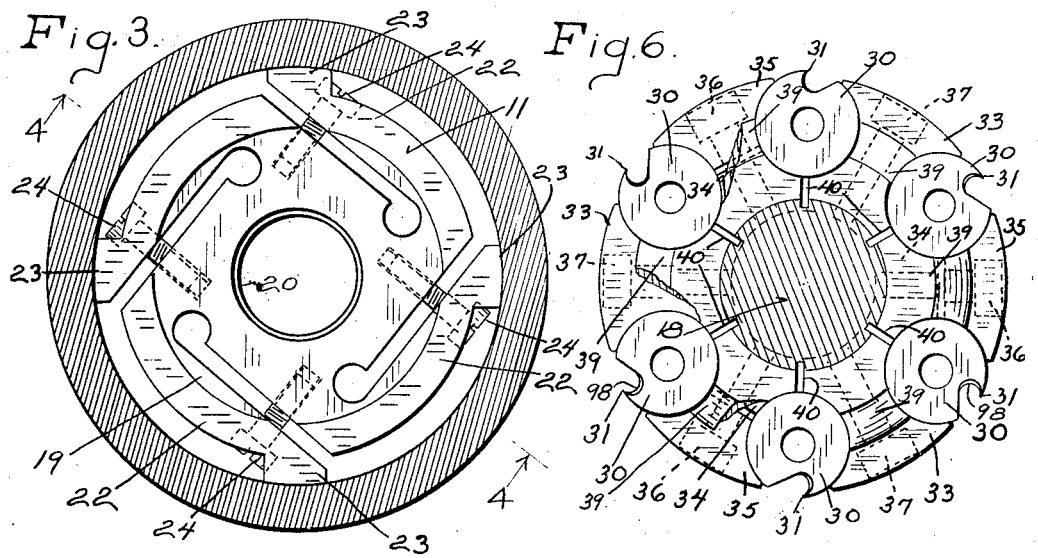
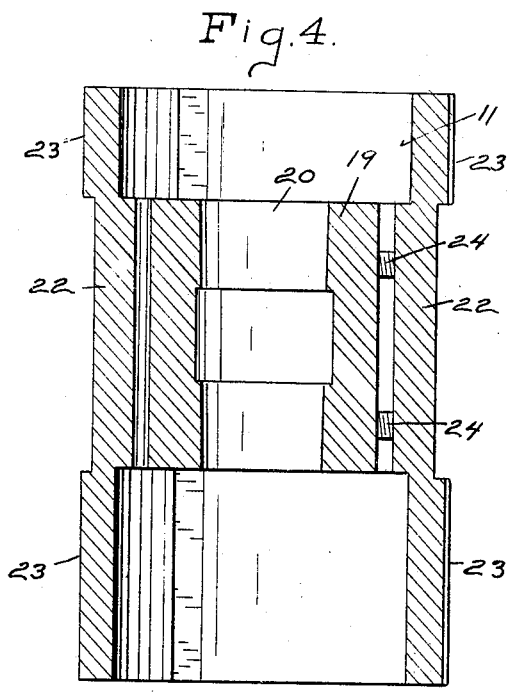
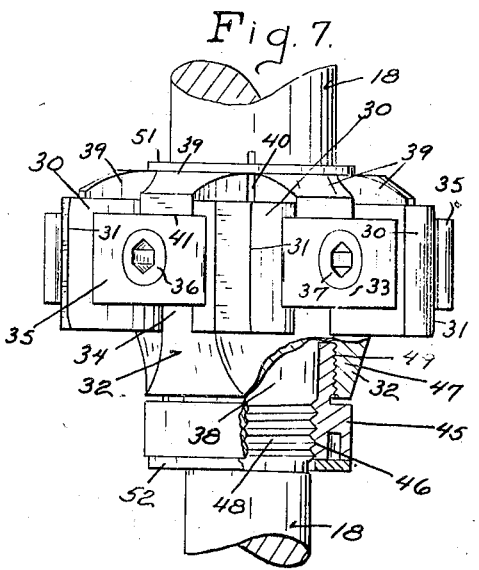
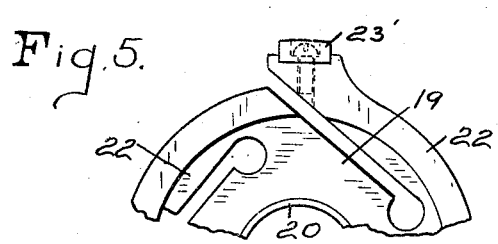
INVENTOR.
Harry O. Smith
BY
Erwin, Wheeler & Woland
ATTORNEYS

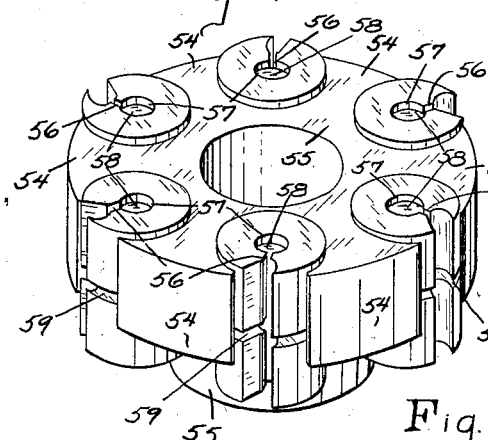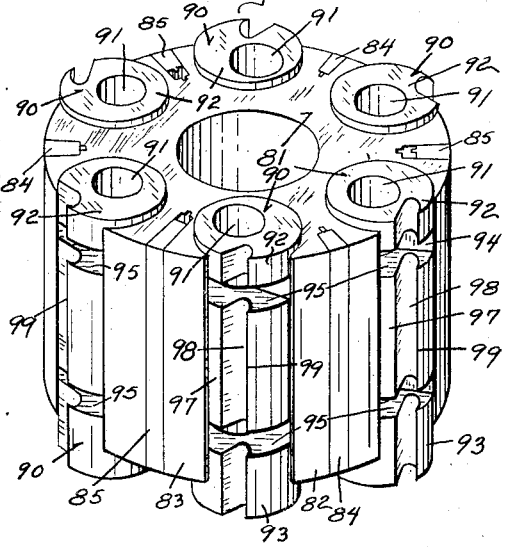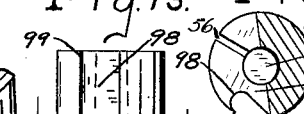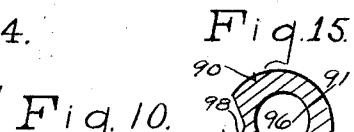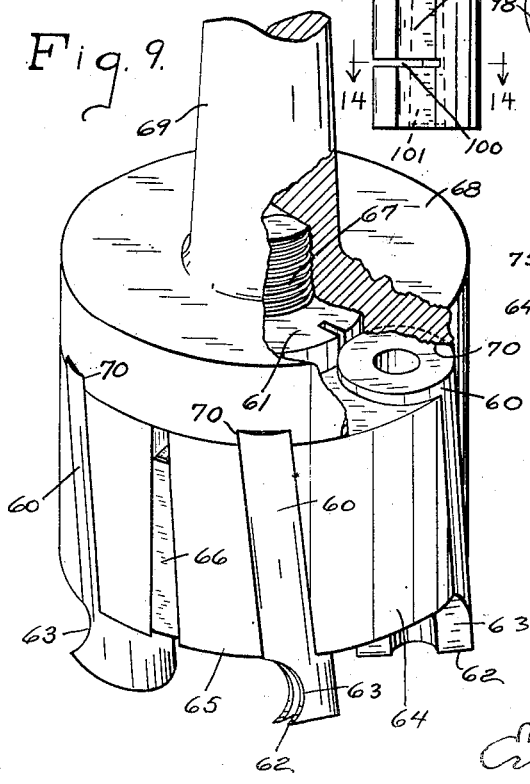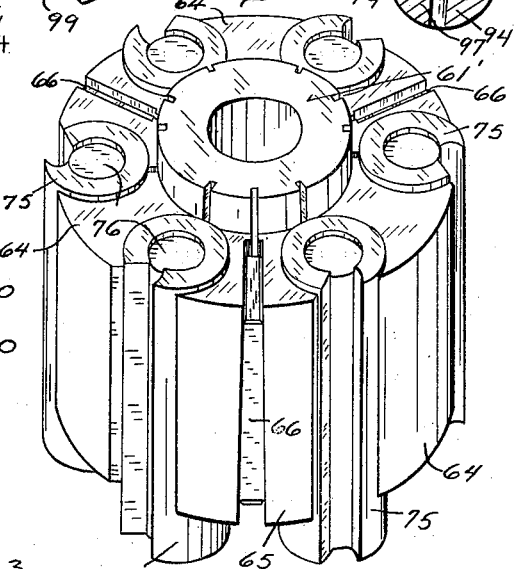

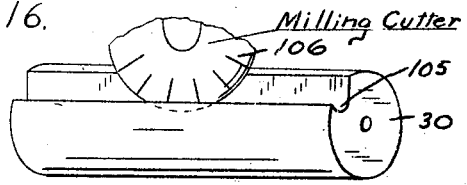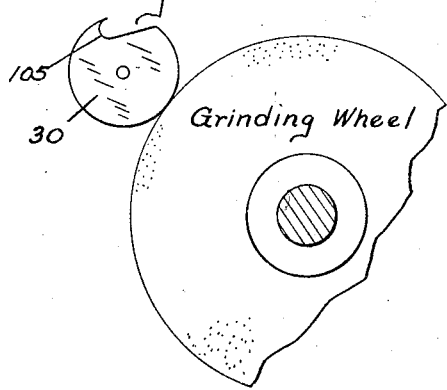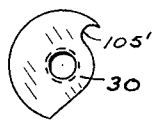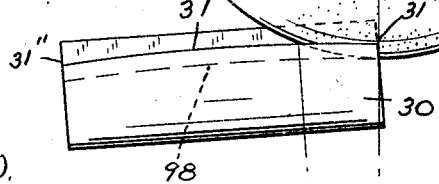

Nov. 10, 1931. H. O. SMITH 1,831,371
REAMER AND PILOT THEREFOR
Filed April 3, 1926  6 Sheets-Sheet 5

INVENTOR.
Harry O. Smith
BY
Erwin, Wheeler & Woolard
ATTORNEYS

Nov. 10, 1931.  H. O. SMITH  1,831,371
REAMER AND PILOT THEREFOR
Filed April 3, 1926    6 Sheets-Sheet 6

INVENTOR.
Harry O. Smith
BY
Erwin, Wheeler & Woolard
ATTORNEYS

Patented Nov. 10, 1931

1,831,371

UNITED STATES PATENT OFFICE

HARRY O. SMITH, OF MILWAUKEE, WISCONSIN

REAMER AND PILOT THEREFOR

Application filed April 3, 1926. Serial No. 99,481.

This invention relates to improvements in the art of reaming. The invention has reference to a reamer assembly and to the component parts thereof, including reamer heads, sets of tools for use therein, pilots or guides for reamer heads, and a special universal drive mechanism or floater for actuating the remainder of the assembly.

It is the object of the invention to make such improvements in tools of this character as will greatly reduce the time required for such operations as the reaming of engine cylinders, gun barrels, and the like, and at the same time will greatly improve the quality of work done.

More specifically stated, it is my purpose to provide a reamer including a head and a number of tools disposed peripherally therein and ground by a novel and improved method hereinafter disclosed to great accuracy of size and to such an edge as will operate with a maximum of effectiveness, and with such degree of perfection that the bore formed during the operation of the tool will require no honing, lapping or grinding, and will not be scratched by the withdrawal of the tool. Thereby the use of the equipment hereinafter disclosed reduces such operations as cylinder boring to a matter of minutes instead of hours and at the same time turns out more perfectly bored cylinders than it is now possible to produce.

With certain types of the improved reamer hereinafter to be disclosed it is desirable to use special methods and equipment involving pilots for the guidance of the reamers directly from the work, and one of the objects of the invention is to provide for the use of such pilots and to provide also a driving mechanism so designed as to permit a controllable degree of universal movement, whereby to make the tool assembly self-centering while maintaining a driving connection therewith.

Other objects of the invention will appear in the course of the description thereof in connection with the following drawings:

Figure 1:
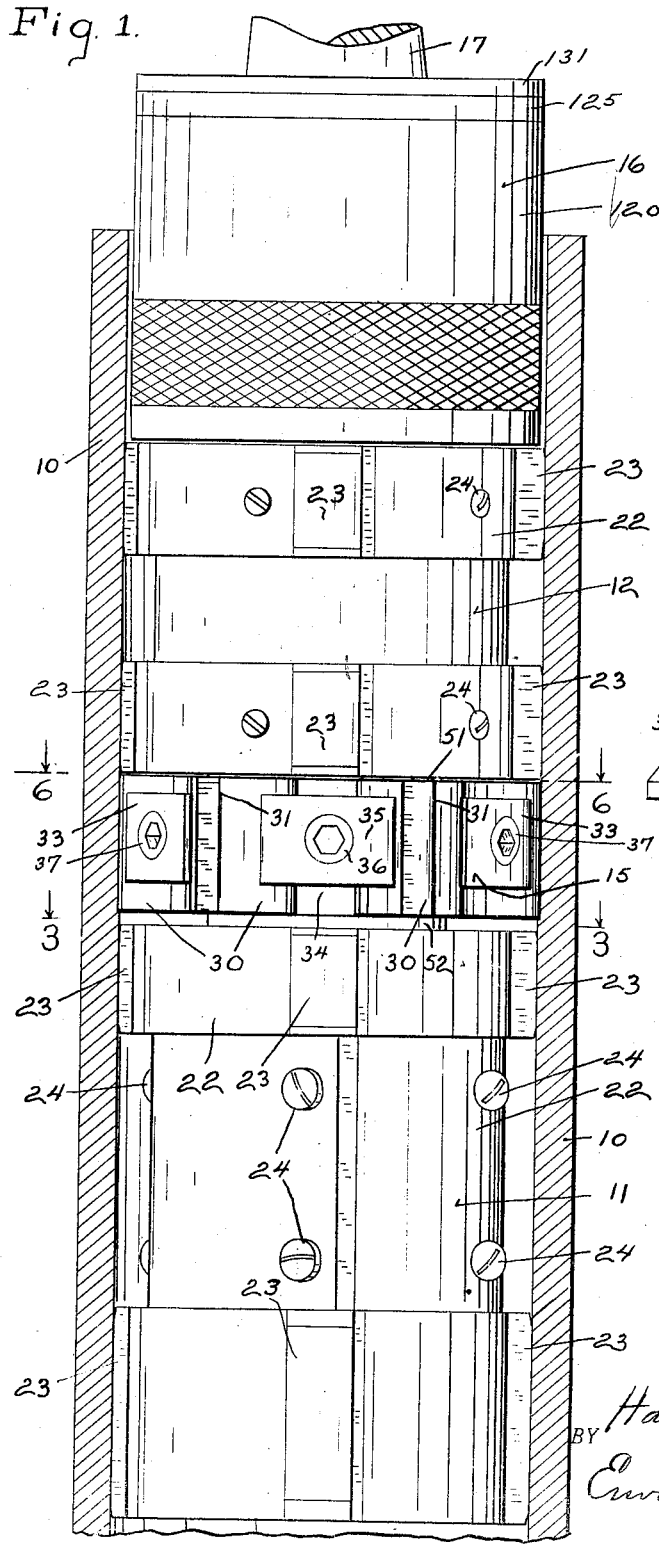
Figure 1 is a side elevation of a complete tool assembly as it appears within a bore, such, for example, as the bore of an engine cylinder, the engine cylinder being shown in axial section.
Figure 2:
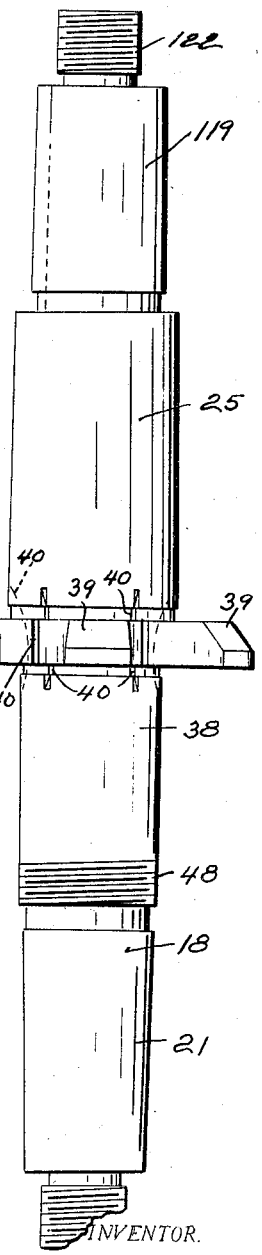
Figure 2 is a side elevation of a shaft suitable for connecting the several pieces of equipment shown in unitary assembly in Figure 1.

Sheet 2 of the drawings contains views of the pilots and reaming tool proper. Figure 3 is a section taken on line 3—3 of Figure 1, showing in plan the top of the advance pilot or guide as it appears within the engine cylinder. Figure 4 is a section taken on line 4—4, showing in axial section the pilot illustrated in Figure 3. Figure 5 is a fragmentary detail of a modified construction of pilot. Figure 6 is a plan view of the reamer proper as it appears when the upper pilot is cut away to the plane indicated at 6—6 in Figure 1. Figure 7 is a view in side elevation of the reamer proper, portions thereof being broken away to expose the means whereby it is connected to the shaft shown in Figure 2.

Sheet 3 shows various types of reaming tools embodying this invention. Figure 8 is an isometric view of a slightly modified type of reamer. Figures 9, 10, and 11 are further modifications of devices embodying this invention, Figure 9 showing an isometric view of a roughing cutter having a portion broken away, Figure 10 showing an isometric view of a standard line reamer which for many purposes is adequate to provide a finished job, and Figure 11 showing a finishing reamer adapted to do the finest character of finishing work. Figure 12 is a plan view of a modified type of reamer tool adapted for use in such a head as that illustrated in Figure 8. Figure 13 is a side elevation of the tool shown in Figure 12. Figure 14 is a section taken on line 14—14 of Figure 13.

Figure 15 is a transverse section taken centrally through one of the tools shown in Figure 11.

Figures 16 to 20 on sheet 4 of the drawings illustrate the method of grinding tools embodying this invention. Figure 16 is a detail isometric view showing the process of milling the axial kerf or groove of one of my improved tools. Figure 17 shows diagrammatically the operation by which the tool is ground to a true cylindrical form. Figure 18 illustrates diagrammatically the grinding of the kerf or groove of the cylindrical tool to reduce it to arcuate form, whereby it is convex in the plane of a chord of the tool. Figure 19 is a detail end elevation of a used tool showing the form which the tool assumes after having been repeatedly ground for the purpose of sharpening it. Figure 20 is a diagrammatic illustration on an enlarged scale of a fragment of one of my improved tools showing the various operations performed thereon in finishing the tool in readiness for use.

Figure 21:
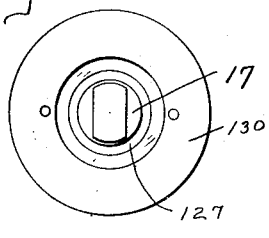
Figure 24:
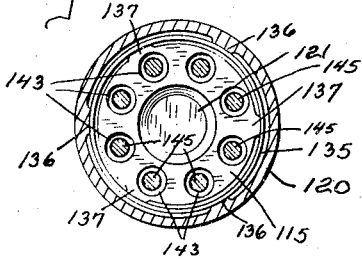
Figure 22:
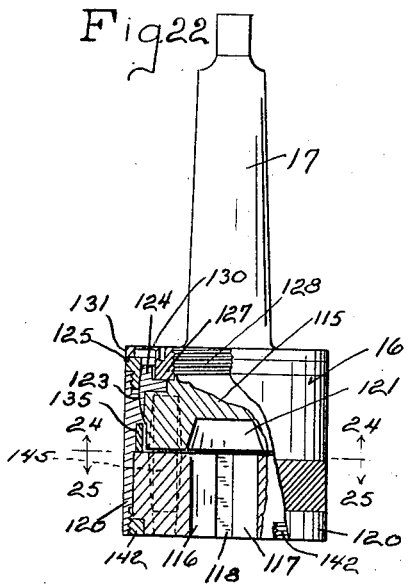
Figure 25:
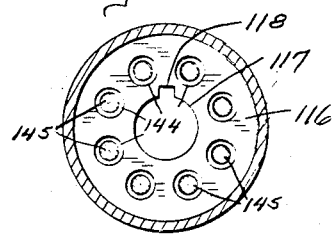
Figure 26:
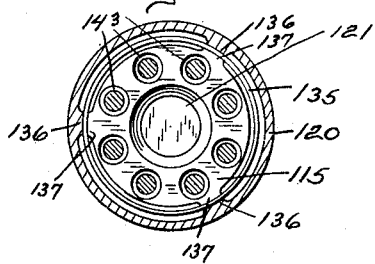
Figure 23:
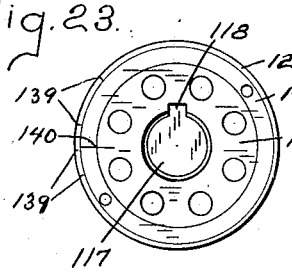
Figures 27, 28:
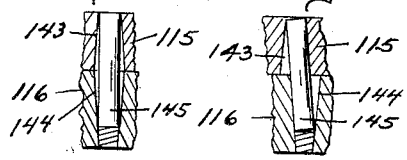

Sheet 5 of the drawings shows various views of a floater or universal coupling head which is used in the practice of this invention for driving certain of the reaming tools shown on the preceding sheets. Figure 21 shows the floater in plan. Figure 22 shows the floater partially in side elevation and partially in vertical axial section. Figure 23 is a plan view of the bottom of the device. Figure 24 is a section taken on line 24—24 of Figure 22. Figure 25 is a section taken on line 25—25 of Figure 22. Figure 26 is a view similar to Figure 24 but showing a different adjustment of the parts. Figures 27 and 28 are detail views illustrating the operation of the pins whereby power is transmitted between the various parts of the floater.

Figure 29:
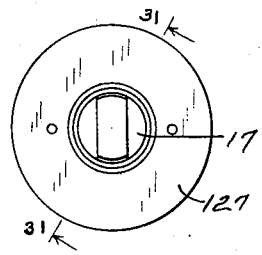
Figure 30:
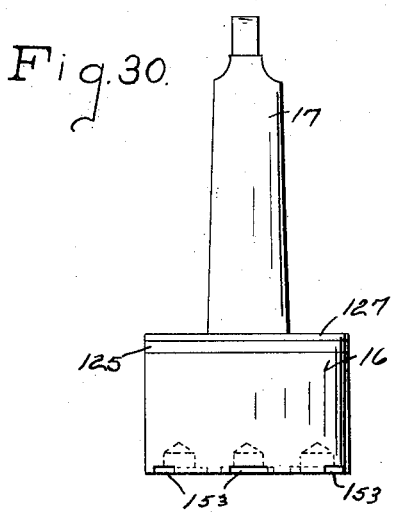
Figure 31:
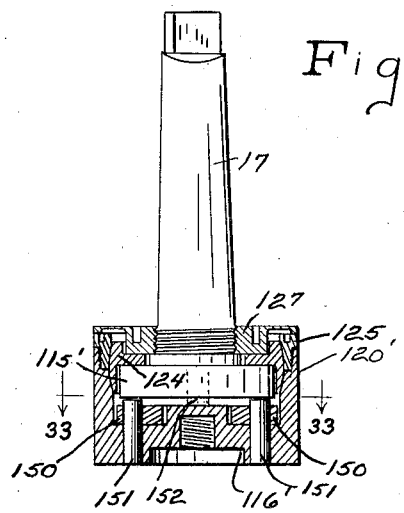
Figure 32:
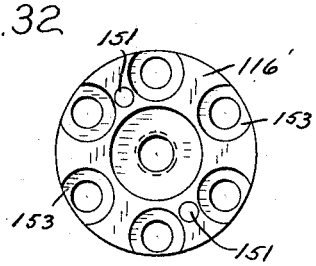
Figure 33:
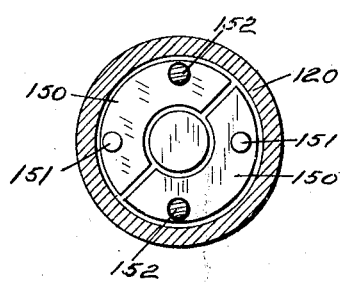

Sheet 6 of the drawings shows a modified type of floater. Figure 29 is a plan view thereof. Figure 30 is a side elevation thereof. Figure 31 is an axial vertical section taken on line 31—31 of Figure 29. Figure 32 is a bottom plan view of the device. Figure 33 is a section taken on line 33—33 of Figure 31.

Like parts are identified by the same reference characters throughout the several views.

It will be noted that the above drawings, after showing the general assembly of equipment in Figure 1, illustrate the details of the various tools and modifications and methods pertaining to these tools in the general order in which the tools enter the work. The following description of the equipment will discuss the several tools in the same order.

In the assembly shown in Figure 1 a cylinder block 10 is being entered by a tool assembly which involves two axially spaced pilots or guides 11 and 12, an interposed reaming tool 15 and a floater or universal coupling 16. The shank 17 of the floater receives the driving power and actuates shaft 18 upon which the two pilots 11 and 12 and the reaming tool 15 are unitarily assembled.

I wish to make it clear at the outset that under many conditions the pilots or the floater, or both, may be dispensed with without affecting the operation of the reaming cutter, but under other conditions it is desirable to use the entire assembly as illustrated. By way of illustration of the particular functions of the pilots and floater I may say that where the work and the machine tool are both substantially perfect there is no need for either the pilots or floater. It is the particular function of the pilots to center the cutting tools accurately in the bore in which they are to operate and to maintain the cutting tools so centered irrespective of possible defects, such as hard or soft places in the work, and irrespective of defects such as looseness or mis-alignment of bearing of the machine tool which actuates the reamer assembly. It is the particular function of the floater to provide a driving coupling for the reaming tools while allowing such universality of relative adjustment as will permit the reaming tool to accommodate itself to the work, either under its own self-centering action or under the guidance of the pilots.

SHEET #2

*The pilots*

Assuming the entire assembly to be used as shown in Figure 1, the first piece of equipment to enter the work is the leading pilot or guide member 11 shown in Figures 3 and 4. This device includes simply a body portion 19 having a tapered bore 20 adapted to receive the complementary portion 21 of shaft 18.

The tangential arms 22 are formed integrally with body portion 19 and are connected thereto at corresponding ends. The arms are formed by cuts which clearly appear in Figure 3 and which allow the arms a considerable degree of resilient movement with reference to the body portion 19 fixed to shaft 18. Each arm is so formed that at its extremity it provides a shoe 23 which, as shown in Figures 1 and 4, may be discontinuous axially of the device. Tension screws 24 limit the outward movements of the resilient and shoe-carrying free ends of arms 22. These screws are threaded to the body proper and the free ends of the spring arms are provided with apertures of such size as to be movable freely toward the body over the screws and to be limited by their outward movement only by the heads of the screws.

The peripheral surfaces of the shoes 23 are finished with the greatest care for the particular work in which the pilot is to be used in order that the margins of these surfaces will not scratch the work. The finishing operation is accomplished by turning up the screws 24 until the arms 22 are subjected to substantially identical tension. Thereupon, with the arms under tension, the peripheries of the shoes are finished to conform to a cylindrical surface of substantially the identical size in which the pilot is to operate. Screws 24 are now turned outwardly to relieve the arms of tension and the pilot, properly assembled upon shaft 18, is introduced into the work. The several resilient arms of the pilot tend to expand outwardly with equal pressure in all directions and the peripheral surfaces of the shoes 23 fit exactly within the cylindrical bore in which they are operated.

The pilot 12 is essentially similar in its construction to pilot 11 but is preferably slightly larger due to the fact that it operates in the finished bore, whereas pilot 11 operates in the unfinished bore. Assuming that it is desired to make a finishing cut of only two thousandths of an inch the peripheral surfaces of shoes 23 in pilot 12 will be finished to conform to a cylinder two thousandths larger in diameter than the cylinder to which the peripheral surfaces of the shoes on pilot 11 conform. In other particulars (apart from length) pilot 12 is substantially identical with pilot 11. Pilot 12 is made to fit on the tapered portion 25 of shaft 18.

Figure 5 shows a fragmentary detail of a modified construction of pilot in which the shoe 23' is detachably secured to the end of arm 22 and may be interchangeably replaced for different work. It should be noted moreover that screw 24 is omitted in the Figure 5 construction, such screw being primarily useful only in the preliminary grinding operation by which the tool is adapted for its work. Where other means of contracting the arms 22 are available they may be used in place of screws 24.

*The reaming cutters proper*

I will first describe the general assembly of the reaming cutter which is shown in Figure 1, and I will refer later to Sheet 3 of the drawings for a description of other types of general assembly and to Sheet 4 of the drawings for a more detailed description of the cutting tools which enter into these assemblies. For the purposes of this application I have chosen to illustrate reaming cutters in which the tool carrying heads are detachably connected with shaft 18 rather than integral therewith. The integral construction is the more expensive and the detachable construction, while cheaper than the other, involves different problems in connection with securing accurate results.

Each of the cutting tools 30 is made from a cylindrical blank and is generally cylindrical in its external contours. Each of the tools shown in Figures 6 and 7, however, is axially grooved along a minor chord in a plane parallel to the axis of the tool to provide a cutting edge 31 where the wall of the groove meets the peripheral wall of the tool. As above indicated, the tools will be described in more detail later. It is sufficient to point up such water as occurs during use and to permit them to be individually adjusted to take up such wear as occurs during use and to permit the cutting angle and relief to be varied at will.

The tool carrying head 32 is provided with a series of radially projecting arms 33 and 34 which differ as to length and are arranged in alternation. Complementary to the shorter arms 34 are removable cap pieces 35. The several arms and cap pieces have surfaces on both sides, as clearly shown in Figure 6, to provide cylindrical recesses in which the cylindrical tools 30 are receivable. The cap pieces 35 are held to the short arms 34 by screws 36 which may be tightened to press the cap pieces upon tools at either side thereof with a wedging and clamping action. When the screws 36 are loosened it is possible to adjust or remove the cylindrical tools 30 at either side of any given clamping or capping member 35. This arrangement is but one of several designs of tool carriers herein disclosed for releasably clamping the tools in place in the carriers.

In order to promote accuracy and to equalize strains throughout the metal of the carrier and throughout the tools themselves the fixed arms 33 and the arms made up of shorter arms 34 and cap pieces 35 are preferably made as nearly identical as possible. The fixed arms are tapped and provided with dummy screws 37 in order that the strains in arms 33 may be distributed substantially in the same manner as the strains in the composite arms 34—35.

A further detail for the promotion of accuracy consists in the preferable location of the tools at slightly varying peripheral distances in the carrier. The tools are arranged diametrically opposite each other in pairs and their respective axes are preferably exactly opposite. The various diameters, however, which connect the opposite tools of the several pairs are not equally spaced angularly. For example, in the present device, which includes a carrier for six tools, the several pairs of tools are not disposed on diameters spaced an even 60° apart. The variation from the 60° angle is so minute as to be almost imperceptible to the naked eye but it is important for the reason that thereby I avoid chattering which would otherwise occur due to the periodicity or regularity with which the several tools would encounter specific portions of the work. The fact that each tool is diametrically opposite to a companion tool of like nature ensures proper balance of pressures on opposite sides of shaft 18 while the irregular peripheral spacing tends to eliminate chattering.

The tool body 32 fits upon portion 38 of shaft 18. Shaft portion 38 is tapered and the tool body is formed with a complementary taper. Fixed integrally to the shaft are arms 39, some of which are partially broken away in Figure 6. These arms are of equal length and each of them has its side margins finished to conform to the cylindrical surface of tools 30. The arms are spaced exactly according to the irregular peripheral spacing of the tools so that there is but one position in which the tool carrier may be assembled with the driving arms of shaft 18. Cuts 40 between adjacent arms permit a certain degree of resilience and operate so that each individual arm will independently exert its driving pressure upon the tool which it abuts in the direction of rotation of the assembly. In order that the tools may receive this driving pressure they are of greater axial extent than arms 33 and 34—35 of the tool carrier.

The tool carrier is so designed that when it is tightly fitted on a tapered portion 38 of shaft 18 it will just abut the end surfaces 41 of arms 39 of the shaft. In order to ensure a snug fit between these parts and to facilitate the mounting and dismounting of the tool carrier with reference to shaft 18, I provide a peculiar nut at 45.

The nut 45 is a differential nut, being provided at 46 with internal threads having greater pitch than the external threads with which it is provided at 47. Its internal threads 46 mesh with threads 48 on shaft 18, and its external threads 47 mesh with threads 49 in the interior of the lower end of the tool carrier 32. The arrangement is such, therefore, that the differential nut 45 will, in either direction of rotation, advance along shaft 18 at a rate greater than the rate with which it advances within the tool carrying body 32. As a result, this nut operates to tighten the tool carrier upon the tapered portion 38 of the shaft and to force it into abutment with surfaces 41 of the shaft-carrying arms 39. At the same time, due to the compound threads of the nut it acts as a lock nut to secure the parts rigidly together. When the nut is backed off it will actually draw the tool carrying head free of the tapered shaft portion 38 so that when the nut leaves the threads of the shaft the tool carrier may readily be drawn from the shaft by hand and without the application of further force. The threads at 47 will preferably be of such a length that the nut will remain attached to the carrier at the time of withdrawal.

Washers are provided at 51 and 52 which may be abutted by the ends of the body portion 19 of the pilot or guide members 11 and 12. It will be noted that each of these pilots is so formed as to embrace parts of the tool carrying assembly, the depending parts of the tool carrying body 32 being received into the top of pilot 11 and the arms 39 of the spider integral with shaft 18 being received into the lower part of pilot 12 when the entire structure is assembled, as shown in Figure 1. By this means the shoes 23 of the pilots are brought into close proximity to the cutting surfaces of the tools 30.

Sheet #3

Upon Sheet 3 of the drawings I have shown various types of tool carriers embodying this invention.

In the Figure 8 construction the arms 54 which project radially from the body 55 of the tool are all of like length, no movable caps or clamping members being necessary. In this construction the necessary clamping reaction is furnished by expanding the tools themselves which, for that purpose, are axially slotted, as shown at 56, and provided with tapered bores 57 into which the slots open. Tapered pins 58 received into these bores expand the individual tools in the recesses formed therefor between arms 54. The tools may also be cut transversely as at 59, if desired, so that the upper and lower portions thereof will act independently under the expanding pressure of the taper pins 58. The Figure 8 construction is intended to be used in the same assembly shown in Figure 1.

Figures 9, 10, and 11 show various classes of tools which are primarily intended for use apart from the pilots and floater illustrated in Figure 1.

Figure 9 shows a roughing cutter in which the cylindrical tools 60 have their axes inclined toward the axis of the tool carrier body 61 and also inclined with reference to an axial diametrical plane intersecting the given tool. The last mentioned inclination is the more evident as viewed in Figure 9 but the inclination of the tool with reference to the axis may also be detected, particularly in connection with the illustration of the tool at the right hand side of Figure 9 in which its cutting end is clearly shown to be disposed at a slightly greater radius than its upper end.

The tools shown in Figure 9 are quite widely different from the tools shown in the remaining views, their cutting edges being formed by a transverse rather than an axial groove. Cutting edges 62 are formed where the wall of the transverse groove 63 of each tool meets the lower end wall of the cylindrical tool. The tools are, however, adjusted and sharpened in the same manner as the other tools disclosed herein and are made and mounted in accordance with this invention. Their mounting includes the comparatively rigid arms 64 which project radially from body 61 in alternation with the radially cleft arms 65 in which wedges 66 operate to clamp the tools 60 in place. The body 61 is provided with a threaded projection 67 which is received into complementary threads of a coupling member 68 carrying a driving spindle 69. This coupling member 68 is shown in Figure 9 to be partially broken away to expose the manner in which it is provided with sockets 70 for the upper ends of the tools. The tools key the carrier 61 against rotation with reference to the coupling member 68 when the tools are properly assembled therein.

The Figure 10 construction shows the application of finishing tools to the same general type of tool carrying body which is illustrated in Figure 9. The body 61' which is illustrated in Figure 10 has radial arms 64 and 65 corresponding to those previously described in connection with Figure 9, the arms 65 being provided with tapered clefts in which the wedges 66 are driven to expand the two portions of arm 65 and to clamp the tools 75 in opposite directions against the relatively fixed arms 64. Wedges 66 in both Figures 9 and 10 move axially to and from wedging position. The recesses appearing at 76 in the ends of the various tools 75 may be used if desired to receive and assist in positioning an instrument used to set the tools properly for any given work.

The device shown in Figure 10 will do a class of work which in the majority of instances would be accepted as finishing work. The device shown in Figure 11 is, by virtue of the tool which it holds, capable of doing the highest degree of fine finishing.

In the Figure 11 construction the tool body 81 has the usual radial arms 82 and 83 arranged alternately. Each such arm has a cleft to receive a wedge driven radially toward the axis of the carrier or tool body. In arms 82, however, the wedges 84 will be left fixed after having once been adjusted, whereas in arms 83 wedges 85 will be removed each time it is desired to adjust or replace the tools on either side of arm 83.

The tools 90 are generally cylindrical in outline, but they differ from all other tools herein disclosed in that the axially extending bores 91 are not central but are eccentrically spaced. The position of these bores determines the spring or resilience of the yieldable portions of these tools, as will hereinafter be more particularly described.

Each of the tools 90 includes relatively nonresilient annular head members 92 and 93. The body portion 94 of the tool is continuous and unbroken along one side thereof to connect integrally the annular heads or end members 92 or 93. At the other side of the tool, however, transverse cuts 95 are made at axially spaced points, and between these cuts there is an axially extending slot 96 opening into the central bore 91 of the tool. The transverse cuts 95 and the axially extending cut 96 defines a relatively resilient arm 97. The axially extending channel or groove 98 which forms the cutting edge 99 of these tools corresponds exactly to the groove used to form the cutting edges in the various other specific forms of tools shown in Figures 6, 7, 8, and 10. In the present instance, however, groove 98 extends continuously across the two end portions 92 and 93 of the tool as well as across the resiliently mounted arm 97. Therefore, while the ends of the tool are rigid, the arm 97 will spring resiliently in pressure contact with the work, and the position of the central bore or opening 91 will determine the thickness of the wall which comprises arm 97, and hence will determine the degree to which such arm will yield under any given pressure.

In Figures 12, 13 and 14 I have illustrated a slightly modified tool which may be used in either of the tool carrying heads shown in Figures 6 or 8, but which has a yieldably supported resilient arm. In structure the type of tool shown in these last mentioned figures is very similar to that shown in Figure 8, the principal difference being that in this further modified construction the channel 98 does not communicate with slot 56 as is the case in the Figure 8 construction. Instead, the channel 98 is so located that the cutting edge 99 is located near slot 56 and, if the free margin of the split ring upon which the blade is formed is not prevented from yielding movement, the result will be a spring tool.

In order to permit of suitably mounting the device while providing for spring action of a portion of the blade, I make a transverse cut 100 which frees the upper and lower parts of the free margin of the tool for independent movement with respect to each other. I then use to secure this tool in its holder or carrier a taper pin 101 which extends only through such portion of the tool as is wholly above or wholly below the cut 100. In this way, the end of the tool in which the taper pin is introduced is expanded to confine the tool properly within the head or carrier and that portion of the blade 99 which is disposed at the other end of the tool is yieldably mounted.

Figure 15 has already been described in connection with the discussion of Figure 11.

SHEET #4

*Formation of cutting edges of tools*

The subject matter disclosed on sheet 4 of the drawings is a very important part of this invention despite the fact that the changes in construction now to be disclosed involve alterations which are measurable only in thousandths of an inch or in smaller units of measurement.

Figure 16 shows the more usual type of tool body blank 30 in the process of being channeled at 105 by a milling cutter 106.

The channel 105 may be exactly parallel to the axis of the tool blank 30 and consequently is not necessarily identical with the channel 98 discussed in connection with the earlier views of this type of tool.

While the exact order of these operations is not of primary importance, nevertheless it is preferred to make the channel or grooves 105 before the cylindrical blank 30 is accurately ground to size. Channel 105 is made in the first instance by a relative movement between the milling cutter 106 and the tool which occurs in the line of a minor chord of the tool at one side of its axis. In the subsequent grinding of the tools to sharpen them, however, the channel advances circumferentially about the axis of the tool at substantially the depth in the tool which is reached by the initial operation. Figure 19 shows at 105′ the extent to which the channel has been projected into a tool blank after many resharpenings.

After the channel 105 has been formed the blank 30 is ground accurately to size and to conform at its periphery with a true cylinder. This operation is shown diagrammatically in Figure 17.

In Figure 18 channel 105 is shaped by contact with a grinding wheel 107 so as to be convex in the direction of tool rotation so that when the tool is properly mounted in a suitable carrier the intermediate portion of the channel will be less deep in the direction of movement of the tool during carrier rotation than the end portions of the channel. It will be obvious that not only will the channel be less deep at its center but the cutting edge or blade portion 31 of the tool will likewise project peripherally at its center beyond its ends.

Channel 98 may conveniently be made by oscillating tool 30 past the grinding wheel 107 upon a radius of 22 inches to 50 inches according to the character of work for which the tool is intended. This radius is drawn about a point located at the indicated distance from grinding wheel 107 along a center line radius of the grinding wheel. As a result the cutting edge 31 of the blade takes the form of an arc drawn on the periphery of the cylindrical surface of the blade. The difference in depth of the channel 98 at its center and at its end is only about three sixty-fourths of an inch when the blade is oscillated on a 28 inch radius.

The purpose of thus forming the cutting edge in an arc is to correct any inevitable irregularities in the operation of the boring machine or other device whereby the blade carrier or reamer is operated. If a machine spindle could be made to run perfectly true with sufficient accuracy to withstand any lateral pressures thereon there would be little occasion for this particular form of tool. In practice, however, machine spindles never do run absolutely true. In boring an engine cylinder, for example, the reamer is fed through the cylinder block for the cutting operation and is then retracted through the block to be withdrawn therefrom. In present practice the reamers inevitably scratch the walls of the cylinder which has been reamed. This is due to two principal considerations, namely,—to the inaccuracy of operation of the driving spindle which, in its slight wabbling, allows the corners of the cutting blades to gouge the wall of the cylinder; and secondly, to the fact that the ordinary reamer blade in cutting presses slightly outwardly on the cylinder wall so that after the blade has passed the inherent resilience of the metal causes it to spring centrally to a very slight degree so that when the reamer is retracted, the hole through which it must be drawn is slightly smaller than the diameter of the reamer.

The peculiar method of grinding the cutting blades herein disclosed overcomes both of these difficulties. It not only facilitates the withdrawal of the tool without ill effects from the wabbling of the driving spindle but, moreover, it is actually possible, in the use of tools embodying this invention, to make the cylinder bore either exactly the same size as the reamer or, if desired, larger than the diameter of the reamer itself.

It will, of course, be understood that the variations of dimension and the slight inequalities in spindle operation which are now being discussed are so minute as to defy measurement except by the most delicate instruments. It is a fact, however, that in present methods of reaming cylinders it is necessary, for satisfactory work, to spend from one hour to several hours in grinding or "lapping in" cylinders in which scratches have been produced by reamer removal, whereas the use of the tools herein disclosed makes it possible to dispense wholly with the grinding operation and to complete a cylinder reaming job within a few minutes or seconds.

After the channel 98 has been formed, as shown in Figure 18, by oscillating the tool about a radius which for ordinary purposes will be approximately 28 inches, the tool is set in the carrier or head in readiness for the final series of operations which make it ready for use.

Even with the greatest of accuracy in forming the recesses between the radial arms of the head into which tools 30 are receivable, it is nevertheless a fact in most instances there will be slight inequalities which will result in locating the several tools at minutely varying radial distances from the center of the tool carrier or reamer head. It is necessary for good work that the cutting edges of the several blades shall lie as nearly as possible at identical radial distances from the center of the tool. At the same time, it is necessary to provide for the usual clearance behind the cutting blade to the end that the action of the blade may be a cutting action and not merely a burnishing action.

It will be noted that at this stage of the proceedings, the cutting edges are located wholly in the peripheries of their respective tools. This necessarily follows from the fact that each cutting edge is produced by the intersection of channel 98 with the peripheral cylindrical wall of the tool. All parts of the cutting edge, therefore, are at the same radial distance from the axis of the tool itself. And, if the axes of the several tools are equi-distant from the axis of the carrier and the tools are adjusted to like positions of rotation in their respective sockets or recesses, the cutting edges must then be disposed in a common cylindrical surface concentric with the axis of the carrier.

Since, however, the axes of the tools are scarcely ever equi-distant from the axis of the carrier, a grinding operation becomes necessary to reduce the reamer assembly to true diameter and form. In contemplation of the necessity of this grinding operation a reamer assembly is preferably designed to be very slightly larger in diameter than is required for the finished reamer.

Figure 20 shows graphically and upon a greatly enlarged and exaggerated scale the operations which are performed upon each of the several tools in a reamer assembly. The center line designated by reference character 110 in Figure 20 will, for the sake of convenience, be designated hereinafter as a principal radius of the reamer. It is a radius drawn from the axis of the tool carrier or reamer head and passing through the axis 111 of the reaming tool 30. An axial plane including a principal radius will be referred to hereinafter as a principal plane. For the purposes of this description the head may be assumed to be of the type shown in Figure 6, in which the tool is confined between arm element 33 on the one hand and the pressure element 35 on the other.

With the several tools in the reamer head preliminary to the final operations such tools will, during the rotation of the reamer head, describe a cylinder represented by the line 112. As previously indicated, it is necessary for the purposes of absolute accuracy to reduce the diameter of the cylindrical surface to be described by the completed product. To this end, tool 30 is adjusted in its socket or recess in the head to project its cutting edge or blade portion 31 forwardly in the direction of tool travel beyond the principal plane which includes the axis of that tool. The tool now has the position indicated in full lines in Figure 20. With the tool in this position it is ground accurately to a cylindrical surface described about the center of the reaming head and represented by arc 113. Thereupon that portion of the tool represented by the shade lines in Figure 20 is removed and as a result of the grinding operation the cutting edges 31 of the several tools are brought to lie exactly in a common cylinder and at like radial distances from the center of the cutting edge. Of course, the distance for which the cutting edge 31 of the tool is advanced beyond the principal plane will be the same in each case.

As a result of this grinding operation the reamer assembly has been reduced accurately to size and form. Its cutting edges, however, lie in a surface which is concentric to the radius of the reamer assembly rather than to the axis of any individual tool. Accordingly, there is not that degree of clearance behind the cutting edges which alone will result in the making of a cut. The next operation has for its purpose the securing of the necessary clearance. To this end each tool individually is rotated counter-clockwise as viewed in Figure 20 about its own axis until its cutting edge abuts or is intersected by the principal plane through that tool. Preferably, the plane will intersect the cutting edge so that the central or more advanced portion 31' of the cutting edge will project slightly in advance of the principal plane and the heel portions 31'' of the cutting edge will lie slightly behind the principal plane. The extent to which Figure 20 has been exaggerated will be appreciated when it is pointed out that in thus rotating the tool from its full line to its dotted line position there is only approximately two degrees of movement necessary following the grinding operation. This very slight degree of movement, however, is adequate to throw the ground surface 114 of the tool within the path described by edges 31 during rotation of the body and hence to afford the necessary clearance.

Because of the fact that in each tool the cylindrically ground surface upon which the arcuate cutting edge 31 is described is not eccentric to the axis of the carrier or head, it will be obvious that more advanced portion 31' of the cutting edge will be slightly more distant radially from the axis of the reamer than the end portions 31'' of the edge. In the tool chosen as an example for the purposes of this description, the radius of the reamer through portion 31' will be approximately one one-thousandth of an inch longer than the radius through tool portion 31''. The reamer assembly has, therefore, a slightly barrel-shaped outline. The curved cutting edge describes a path convex with respect to the axis about which it moves.

A reamer provided with a tool so ground will leave substantially unscratched the wall of a bore through which it is retracted. It is possible by varying the arc of curvature of channel 98 to compensate for any ordinary irregularities of spindle operation. It is also possible, by following the above method for grinding and setting the tools in the reamer head, to ream a hole which, in the finished product, will be measurably larger than the diameter of the reamer by which it was formed. A tool having the particular form of edge herein described will actually draw the work toward the center about which the tool is being rotated instead of thrusting the work under pressure away from the center. As a result, the slight reaction which follows the passage of the tool, will be a springing of the work from the center instead of a crowding of the work toward the center. The design of tool specifically described is such that the finished bore will be substantially identically the diameter of the reamer, but by varying the angle of clearance and the arc of channel 98 it is possible to bore a larger diametered hole if desired.

The above described methods of grinding and cutting are applicable to all of the reamer tools herein disclosed whether or not such tools incorporate spring blades. The roughing cutter shown in Figure 9, although its edge is disposed in a different plane from the edges of the other cutting tools, is nevertheless ground to size by rotatively advancing each tool on its given axis, grinding all tools to cylindrical surface drawn about the axis of the tool carrier, and by subsequently rotating each tool reversely to bring its cutting edge substantially to the principal plane. In the roughing cutter, of course, there is an additional clearance afforded under the heel of the tool by virtue of the fact that the axis of the entire tool is thrown at an angle to the principal plane in the direction of tool advance.

Sheet #5

The floater

The assembly shown in Figure 1 includes not only the reaming tool, but a set of guides or pilots to support the tool from the work and a universal coupling for driving the tool from a suitable spindle while permitting the tool such freedom of movement as is necessary for any given circumstance. While I am illustrating a plurality of forms of floaters for this purpose, I prefer that construction shown on Sheet 5 of the drawings. It not only has a remarkable action in maintaining the reamer properly in alignment, but it has the further advantage that the degree of relative movement between the parts coupled thereby is subject to control.

The construction shown on Sheet 5 of the drawings includes a power receiving member 115 provided with spindle 17, a power delivering member 116 provided with a recess 117, a key slot 118 to receive and connect with the end 119 (see Figure 2) of shaft 18, and a generally tubular shell 120 in which these bodies are housed. A recess 121 in member 115 is adapted to receive a nut threaded to shaft 18 at 122.

Universal movement to an extremely limited degree is permitted between the power receiving and the power delivering parts of the device through the provision of a universal connection between member 115 and the shell 120, the latter being adjustably fixed with reference to the power delivering member 116. The shell 120 is constructed to provide an annular concave spherical surface at 123 in which the convex annulus 124 is fitted complementarily. An annular retaining nut 125 fits about ring 124 and has surfaces which are continuations of the spherical surface 123. Thereby the ring 124 is anchored for universal movement within the shell 120.

Ring 124 fits closely about the power receiving member 115 and is positioned thereon by the pressure of a spring nut 127 threaded at 128 to the base of spindle 17. Nut 127 includes an annular web 130 which has considerable resilience and constitutes an annular spring. Integral with this web is a marginal flange 131 so surfaced that it will contact firmly with the top of nut 125 when nut 127 is turned up rightly to its proper position. As a result of this arrangement relative universal movement between the power receiving and power delivering portions of this piece of apparatus is restricted to the degree of flexibility afforded by the spring web 130 which tends constantly to maintain the parts relatively centered. Sufficient clearance is provided between members 115 and 116 to accommodate this degree of wabbling movement between the parts.

There is a further spring provided for opposing lateral movement between the parts above described and for regulating its degree. The annular spring 135 comprises a short length of resiliently walled tubing interposed between the lower end of power receiving member 115 and the laterally adjacent portions of the shell 120. Shell 120 and the lower end of member 115 are provided respectively with oppositely projecting bosses 136 and 137, these bosses being equally spaced peripherally on the shell power receiving member.

When the power receiving member is adjusted with reference to the shell so that the parts occupy the relative positions indicated in Figure 24, each boss 137 on member 115 will be spaced intermediate two bosses 136 of the shell and vice versa. The length of spring intermediate any two given bosses on one side of the spring will be free to flex under the pressure of a single boss acting on the other side of the spring. If, however, the parts are adjusted to the relative positions in which they appear in Figure 26 so that each boss 136 registers with a boss 137, it will be obvious that no lateral movement whatever can occur between these parts and such movement (for which provision is made by clearance between the annular frustum 124 and member 115) is wholly prevented. By adjusting the bosses 136 and 137 to various degrees of arcuate separation, it is possible to obtain various degrees of resilient opposition to the lateral play between the driving and driven parts.

The angular adjustment between member 115 and shell 120 may be effected by rotating member 116 with reference to the shell. The power transmitting members 115 and 116 are provided with a motion transmitting connection hereinafter to be described, and in Figure 23 I have shown the lower peripheral margin of shell 120 to be provided with a series of graduation marks 139, with reference to which a single graduation mark 140 on member 116 may be positioned. These marks serve as an index to the relative positions of lugs 136 and 137 within the device when the parts are in their normal positions, and when the adjustment is secured it may be fixed by screwing down the internal nut 142 which is threaded within the end of shell 120 and presses power delivering member 116 axially within the shell into engagement with the ends of the bosses 136 thereof.

In the mechanism thus far described there is no means for positive power transmission from the power receiving member 115 to the power delivering member 116. In providing such a means it is necessary to take into consideration the universal or wabbling movement which sometimes occurs between the parts. It is also desirable to provide for a limited degree of relative lateral movement between the power receiving and the power delivering members. Both results may be very satisfactorily accomplished as follows.

A set of tapered holes 143 are made in power receiving member 115, and a complementary set of registering holes 144 are made in the power delivering member 116. Coupling pins 145 extend into both holes. The pins are preferably true cylinders, or at least they are so formed that they fit closely at their ends to the holes in which they are placed to afford a material degree of clearance between the intermediate portions of each pin and the laterally adjacent portions of the holes in which the pins are set.

As a result of this arrangement, it is possible for a considerable degree of play to occur between the spaced faces of members 115 and 116, as shown in Figures 27 and 28. The power transmitting connection, however, between these parts will be positive in the sense that the degree of relative movement is always limited and there is always a tendency for the parts to be restored to their normal central positions. It will be noted, however, that due to the fact that each of the several holes 143 and 144 is round in cross section, there is always a tendency for the members 115 and 116 to center themselves under pressure.

Assuming that rotative movement is applied to member 115 through its shank portion 17, and assuming that part 116 is delivering this rotative motion under the resistance encountered by the tools as they feed through the work, it will be obvious that any lateral or wabbling displacement between the parts 115 and 116 will result in causing each of several pins 145 to move laterally from the radius along which the thrust of the driving power tends to maintain it. In so moving laterally the pin will also be caused to move rearwardly against such thrust due to the fact that it will encounter the rearwardly rounding surface of that portion of the hole in which it is loose. Consequently, the thrust at all times tends to maintain the device properly centered.

In practice, the degree of relative movement between the parts is almost imperceptible but it is sufficient to permit the reaming tools to accommodate themselves to the work irrespective of irregularities in the movement of the driving connections.

Sheet #6
Modified floater

In the modified construction shown in Figures 29 to 33, inclusive, the general arrangement and purposes of the devices correspond closely to those already described. In this construction, however, a flange 120' integral with the power delivering member 116' takes the place of the shell 120 previously described. The spherically concave annular nut 125, spring nut 127, and the frusto spherical annulus 124 correspond closely to parts designated by like numbers in Sheet 5.

In this modified device motion is transmitted from the power receiving member 115' to the power delivering member 116' through the medium of a set of arcuate links 150 which are housed within flange 120', and each of which is pivoted at spaced points to both of said members. Pivot pins 151 fulcrum each link to the power delivering member 116'. Pivot pins 152 spaced from pins 151, as clearly shown in Figure 33, fulcrum each link to power receiving member 115'. The links provide for the necessary freedom of movement between said members while transmitting rotative motion positively from one to the other. The degree of clearance necessary for the practical operation of this device is far less than that which is shown in the drawings.

In this modified construction I have shown how the under surface of the power delivering member 116' may be provided with recesses at 153 for the several tools of a carrier connected in any suitable manner thereto or formed integrally therewith. In each of the various devices herein disclosed it will be noted that I prefer to apply the power directly to the tools themselves, thereby minimizing strains on the carrier.

Summary of operation

It will be understood from the foregoing description of the invention that the invention contemplates primarily a novel and improved tool having a peculiar edge. The invention further has to do with the method of forming that edge and of setting each tool in its proper position in a tool carrier to comprise a unitary reamer. Furthermore, the invention has to do with novel means and methods of supporting and driving the reamer unit. All of these various aspects of the invention have been dealt with separately in the foregoing description but are comprehended in the single conception of the complete tool assembly shown in Figure 1. The particular types of reamer heads or tool carriers heretofore disclosed are all designed expressly for the purpose of facilitating the methods of grinding and setting the individual tools to ensure successful operation. One of the important features of the invention consists in the fact that the diameter of the tool does not become appreciably changed when the tool becomes dull and is re-sharpened, due to the fact that the cutting edge of the tool is at all times located in its periphery and that by rotating each tool on its own axis to bring its cutting edge into a principal plane of the carrier the original diameter of the assembly will be maintained. This feature is extremely important to the successful operation of a reamer head carrying a multiplicity of tools, because if it were not possible to bring the cutting edges of all tools into a common circle it would be obvious that some of the tools would not be in operation. In accordance with this invention, however, I not only start with a design of carrier and tool which permits of a maximum degree of initial accuracy, but I find it desirable further to manipulate and adjust the individual tools to make each reamer assembly absolutely accurate and then, in order that this extreme degree of accuracy may be reflected in the work done by the reamer, I may provide a special mounting and may even arrange by a special method of operation to support the tool directly from the work.

Having given this brief résumé of the general characteristics of the invention, I will now summarize the principal steps taken in the assembly and use of devices embodying the invention.

Starting with the cylindrical tool blank 30 I mill a channel therein to define roughly a peripheral cutting edge, as shown in Figure 16, the tool blank being ground to true cylindrical form. The milled channel is next ground to arcuate form so that the cutting edge, all portions of which lie in the cylindrical surface of the tool, will project peripherally in the direction of tool advance to a greater extent in its center than at its ends. This operation is shown in Figure 18.

Several tools manufactured in like fashion are now assembled in a tool carrier or reamer head, a specimen of which appears in Figure 6. The sockets in which the tools are received are carefully positioned so that the tools of each pair are exactly diametrically opposite but are at varying arcuate distances from each other in the periphery of the carrier. Every effort is made to have the radial distances of the several tools from the center as nearly identical as is possible.

In order to correct for any inaccuracies in this regard a sequence of operations shown graphically in Figure 20 is followed. Each tool is so adjusted that its cutting edge lies in approximately one half a degree of rotation in advance of a principal plane, including the axis of the head and the axis of the individual tool. Thereupon, the several tools are subjected to a grinding operation which leaves their exposed peripheries exactly at the proper radial distances from the center of the head and concentric therewith. Following this sizing operation it is necessary to destroy the concentricity above referred to in order to afford clearance for the cutting edges of the tools, and each tool is rotated opposite to the direction of its movement in the work to retract its blade approximately to its principal plane. The tool assembly is now in readiness for use and, without other appliances, will give more accurate results than tools heretofore known, due,—first, to the accuracy with which the several cutting edges are made to conform to an imaginary cylindrical surface by the methods previously described, and second, to the particular shape of the cutting edge heretofore described.

In order, however, to take increased advantage of the great accuracy of this tool I have provided means for eliminating inaccuracies in the boring machine or like device in which such tools are usually mounted.

The first means which I may employ for this purpose consists in a pilot or pilots which engage the work upon either side of the finishing cutter. These pilots are designed to center the cutter exactly with reference to the work and with such precision that variations in the density or resistance of metal encountered during cutting operation will have little or no effect upon the position of the cutter and to the further end that irregularities in spindle operation cannot affect the position or direction of movement of the cutter.

The pilots make it possible to do extremely fine work. Without them any difference in hardness of the metal encountered during a reaming operation involving the removal of only one five-thousandths of an inch on a side would almost inevitably mean that the cutter would be drawn out of line. Where the pilots are used, however, it is possible accurately to remove this amount of metal from a bore regardless of such variations of hardness as generally are found.

In order that the pilot may have unhampered control of the movement of the cutter, I prefer also to use a floater or universal coupling device last described above, which is calculated to transmit rotative movement to the cutter while allowing the cutter to receive independent positioning support and to be unaffected by the wabble or oscillation of the driving spindle. It will be understood, of course, that these various allowances are made to compensate for such irregularities of movement as are found in reasonably good machines but are nevertheless intended and adapted to enable poor machines to turn out perfect work in finishing holes already true as to line.

I have also made it clear above that the universal couplings or floaters above described may be used directly in connection with the reaming cutters themselves and without the pilots where the character of the work is such as to make this advisable. In some classes of work which do not require an extremely fine cut, and in which the metal is of a reasonably uniform character, the pilots are not needed and the reamers will center themselves in the work to such an extent that by the use of the floaters the wabbling of a drive shaft will have no effect on the reamer. To the extent to which the drive shaft may be a perfect fit in its bearings, it is possible to dispense with the floater, and to the extent to which the drive shaft is of such strength and accuracy as to fix properly the axis of rotation of the cutter, it is possible also to dispense with the pilots.

When the individual tools of the reamer have been used for a sufficient length of time so that their blade portions or cutting edges become dull, it is possible to sharpen them readily by deepening the channel which forms such edges. It will not be necessary at each sharpening to repeat the peripheral grinding operation, which is the first step illustrated in Figure 20, but it will be necessary at each sharpening to reset the tools to bring their cutting edges into the several principal planes. It is only when the portion peripherally ground is obliterated by repeated sharpenings that this peripheral grinding operation again becomes necessary. It will be found that tools made in accordance with this disclosure will not require sharpening as often as the ordinary reaming tool for the reason that these tools actually cut the work by virtue of their peculiar construction in accordance with the methods herein disclosed, and the cutting is accomplished with a minimum of distortion of the cutting edge.

I claim:

1. In combination with a device of the class described, a reamer having a cutting blade, a positioning device comprising a body connected to said reamer and having a series of circumferentially disposed resilient shoes integral with said body and arranged to expand laterally outward and adapted to contact with the work upon which said blade is operated, and means for limiting the outward movement of the shoes.

2. In a device of the class described comprising a reamer, a blade mounted therein, and a positioning device secured coaxially with said reamer and comprising a body connected to said reamer and having a series of circumferentially disposed resilient shoes integral with said body and arranged to expand laterally outward and adapted to contact with the work upon which said blade is operated, and means for limiting the outward movement of the shoes.

3. In a device of the class described, the combination with a floater including motion receiving and motion delivering parts in flexible connection, of a shaft connected with the motion delivering part, reaming mechanism mounted on said shaft intermediate the ends thereof, and positioning devices mounted on said shaft upon either side of said reaming mechanism, each of said positioning devices comprising a body connected to said reaming mechanism and having a series of circumferentially disposed resilient shoes integral with said body and arranged to expand laterally outward and adapted to contact with the work upon which said blade is operated.

4. In a device of the class described, the combination with a floater including motion receiving and motion delivering parts in flexible connection, of a shaft connected with the motion delivering part, reaming mechanism mounted on said shaft intermediate the ends thereof, and positioning devices mounted on said shaft upon either side of said reaming mechanisms, each of said positioning devices comprising a body connected to said reaming mechanism and having a series of circumferentially disposed resilient shoes integral with said body and arranged to expand laterally outward and adapted to contact with the work upon which said blade is operated, one of said positioning devices being smaller than the other.

5. In a device of the class described, the combination with a floater including motion receiving and motion delivering parts in flexible connection, of a shaft connected to the motion delivering part and reaming mechanism mounted on said shaft intermediate the ends thereof, positioning devices mounted on said shaft upon either side of said reaming mechanism and including a body connected to said reaming mechanism and having a series of circumferentially disposed resilient shoes integral with said body and arranged to expand laterally outward and adapted to contact with the work upon which said blade is operated, the positioning device in advance of the reaming mechanism being smaller than the positioning device behind said reaming mechanism, and means for limiting the outward movement of said shoes.

6. A reamer comprising a head having a plurality of longitudinally extending sockets adjacent its periphery, substantially cylindrical cutting blades fitted into and rotatably mounted in said sockets, each of said blades having a portion of its periphery exposed beyond the periphery of said head, a part of said portion being formed upon a surface slightly eccentric to the head and of like radius, said blades having their cutting edges in said eccentric blade surface, and said surface constituting a clearance for said cutting edge.

7. A reamer comprising a head having a plurality of longitudinally extending sockets adjacent its periphery, substantially cylindrical cutting blades fitted into and rotatably mounted in said sockets, each of said blades having a portion formed upon a surface concentric to the head and of like radius, said blades having their cutting edges in said concentric blade surface whereby when said blades are rotated in said sockets to a second position the said surface becomes eccentric to the head and forms a clearance for said edges.

8. In a reamer, a cutting blade having a substantially cylindrical surface, a portion of said blade being formed upon a second cylindrical surface of substantially greater radius than the diameter of said blade, said blade having formed therein a channel bowed outwardly at the central portion of the blade and intersecting said second surface to form convexedly curved cutting edges convexedly curved both radially and circumferentially.

9. A cutting blade of the class described having a substantially cylindrical surface, a portion of said blade being formed upon a second cylindrical surface of substantially greater radius than the diameter of said blade, said blade having formed therein a channel bowed outwardly at the central portion of the blade and intersecting said second surface to form convexedly curved cutting edges both radially and circumferentially.

HARRY O. SMITH.